United States Patent [19]

Morishima

[11] Patent Number: 4,600,208
[45] Date of Patent: Jul. 15, 1986

[54] SPEAKER SYSTEM FOR MOTORCYCLES

[75] Inventor: Kazuo Morishima, Shiki, Japan

[73] Assignee: Honda Giken Kogyo K.K., Tokyo, Japan

[21] Appl. No.: 750,546

[22] Filed: Jul. 1, 1985

[30] Foreign Application Priority Data

Jul. 6, 1984 [JP] Japan .......................... 59-102037[U]

[51] Int. Cl.⁴ ............................................. B62J 39/00
[52] U.S. Cl. ............................ 280/289 A; 280/289 S; 296/78.1; 381/86; 455/345
[58] Field of Search ........... 280/289 R, 289 A, 289 S, 280/289 H; 180/219; 296/78.1; 381/86; 455/345, 350, 351, 89, 99; 224/32 A

[56] References Cited

U.S. PATENT DOCUMENTS

| | | | |
|---|---|---|---|
| 4,445,228 | 4/1984 | Bruni | 381/86 X |
| 4,473,251 | 9/1984 | Murayama | 296/78.1 |
| 4,490,842 | 12/1984 | Watanabe | 381/86 |
| 4,549,629 | 10/1985 | Komuro | 180/219 |

*Primary Examiner*—John A. Pekar
*Attorney, Agent, or Firm*—Arthur L. Lessler

[57] ABSTRACT

In a two-rider motorcycle having front and rear seats, a pair of speakers are arranged, at opposite lateral sides of the frame body, on a receptacle mounted on the frame body at the back of the rear seat. The speakers each have its front surface directed forwardly upwardly of the frame body.

13 Claims, 6 Drawing Figures

SPEAKER SYSTEM FOR MOTORCYCLES

BACKGROUND OF THE INVENTION

This invention relates to a speaker system for motorcycles.

Conventional sound systems provided on motorcycles usually have a pair of speakers arranged inside opposite lateral side portions of a fairing which covers a front end portion and opposite lateral side portions of the motorcycle body. In the case of a two-rider motorcycle having such arrangement of sound system, the rider on the rear seat cannot listen to sound radiated by the speakers so clearly as the rider or driver on the front seat, since the former is remoter from the speakers than the latter, and transmission of sound from the speakers to the rear seat rider is somewhat hindered by the driver.

SUMMARY OF THE INVENTION

It is the object of the invention to provide a speaker system for use on motorcycles, which is arranged and constructed so that the rear seat rider can listen to the speaker sound as clearly as the front seat rider or driver.

The present invention provides a motorcycle comprising a frame body, a pair of front and rear seats mounted on the frame body, a receptacle mounted on the frame body at a location rearward of the rear seat, and a pair of speakers arranged on the receptacle at opposite lateral sides of the frame body. The speakers each have a front surface thereof directed forwardly upwardly of the frame body.

The above and other objects, features and advantages of the invention will be more apparent from the ensuing detailed description taken in conjunction with the accompanying drawings.

DETAILED DESCRIPTION

The invention will now be described in detail with reference to the drawings illustrating preferred embodiments thereof.

Figure 1:
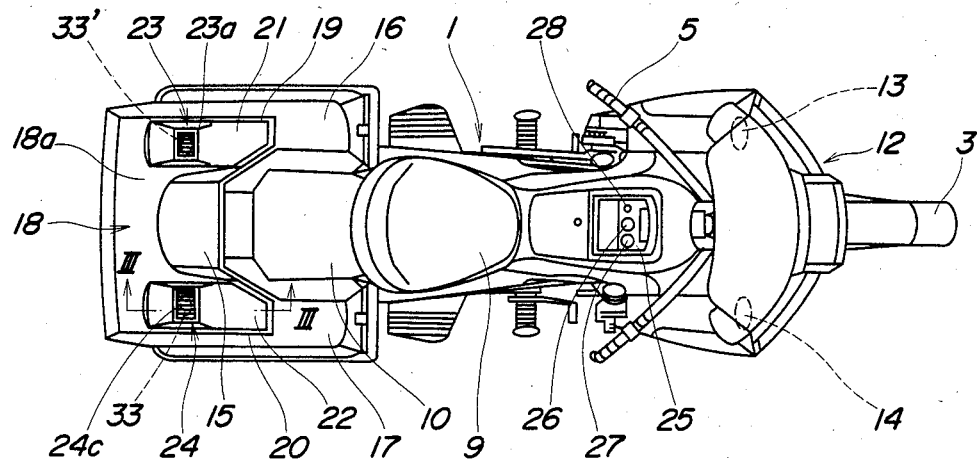
FIG. 1 is a top plan view of a motorcycle equipped with a speaker system according to a first embodiment of the invention.
Figure 2:
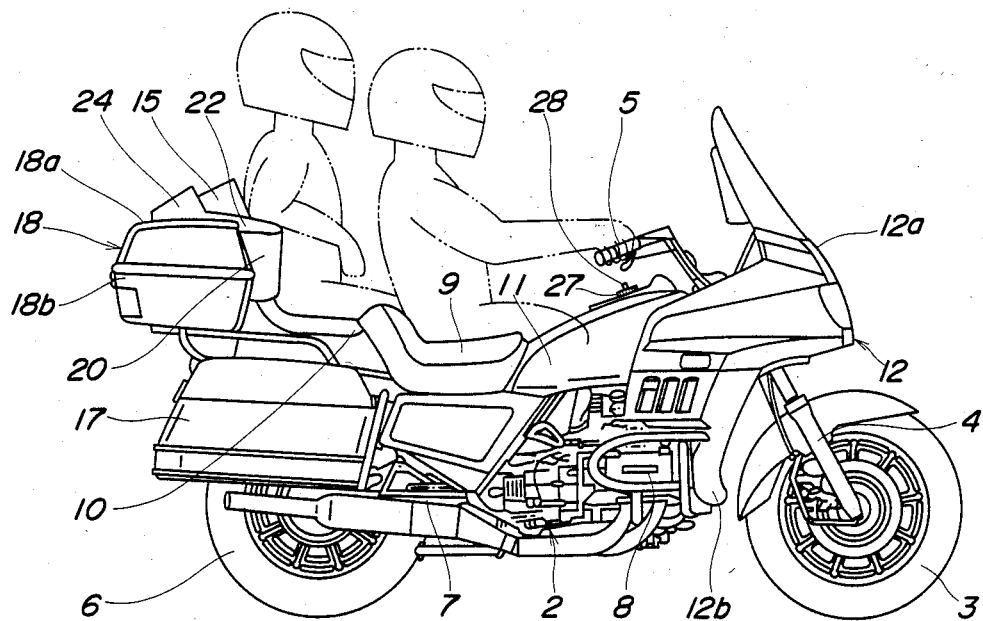
FIG. 2 is a side view of the motorcycle of FIG. 1.

Referring first to FIGS. 1 through 4, there is illustrated a motorcycle equipped with a speaker system according to an embodiment of the invention. In FIGS. 1 and 2, reference numeral 1 designates a body of the motorcycle which has a frame body 2. The frame body 2 has a head tube, not shown, on which is turnably supported a front fork 4 carrying a front wheel 3, via a steering system and a fork top bridge, neither of which is shown. A steering handle 5 is mounted on an upper end of the fork top bridge. A rear fork 7 carrying a rear wheel 6 is rockably mounted on a rear portion of the frame body 2 by means of pivot bolts, not shown. Mounted on the frame body 2 at a central portion thereof is an engine 8 of which output is transmitted to the rear wheel 6 by means of a power transmission including a drive shaft, not shown. A front seat 9 and a rear seat 10, which are combined together, are mounted on the frame body 2 in a manner extending an axially central upper portion of the frame body 2 to a rear upper portion thereof. A shelter 11 as a dummy tank, in the form of a fuel tank, is interposed between the front seat 9 and the head tube. A fairing 12 is mounted on the frame body 2 by means of a fairing frame, not shown, in a manner covering a front end portion of the motorcycle body 1 and opposite lateral side portions thereof. The fairing 12 has an upper portion (upper fairing) 12a located in front of the steering handle 5 and covering a headlight casing, not shown, the head tube, etc. and opposite lower lateral side portions (under fairing) 12b covering a front end portion of the frame body 2.

A sound system composed e.g. of a radio receiver is installed on the motorcycle body 1, and includes a pair of front speakers 13 and 14 arranged inside opposite lateral side portions of the upper fairing 12a, with their front surfaces directed toward a rider (driver) position.

On the other hand, a backrest 15, which is fabricated in a separate body from the rear seat 10, is arranged adjacent the rear seat 10 at the back thereof. A pair of side trunks 16 and 17 are mounted on the frame body 2 by means of a trunk frame, not shown, at opposite lateral sides of the frame body 2 below the rear seat 10 and axially extend to a rear end of the motorcycle body 1 in a manner covering an upper half of the rear wheel 6. A trunk 18 as a receptacle is mounted on the frame body 2 by means of the aforementioned trunk frame at the back of the rear seat 10 and extends from opposite lateral sides of the backrest 15 to the rear end of the motorcycle body 1. Pockets 19 and 20, which are formed of a flexible material, such as leather, and thus freely deformable, are arranged adjacent a front end of the trunk 18 at opposite lateral sides thereof, for accommodating an intercom unit, not shown, etc. A pair of armrests 21 and 22 are mounted on ceiling walls of the respective pockets 19, 20 as well as on a lid 18a of the trunk 18 and extend from front end edges of the ceiling walls to axially central portions of the lid 18a. The armrests 21, 22 are formed integrally with speaker boxes 23 and 24 which accommodate speakers 33 and 33'.

Reference is now made to the arrangement and construction of the armrest 22, pocket 20 and speaker box 24 on the right side of the motorcycle body 1.

Figure 3:
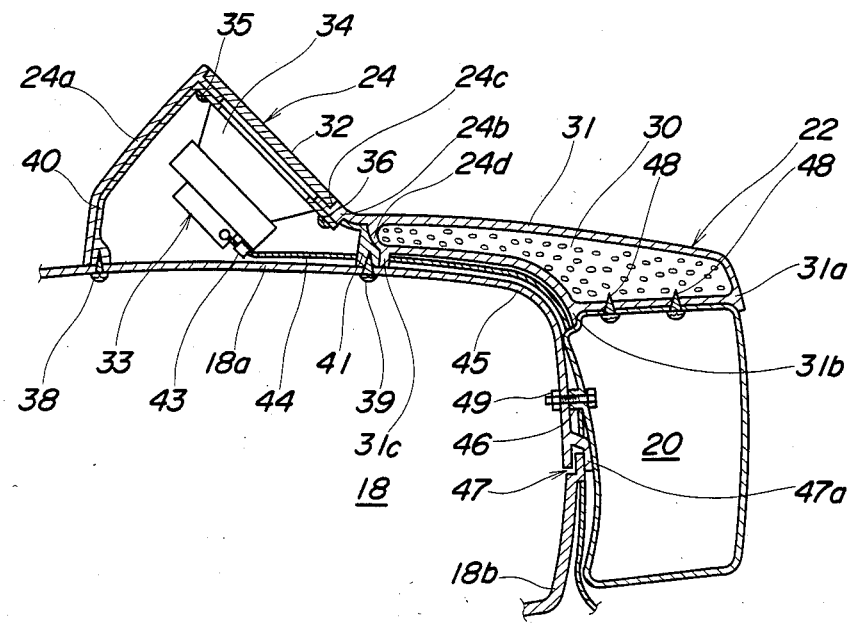
FIG. 3 is a sectional view taken along line III—III in FIG. 1.

As shown in FIG. 3, the trunk 18 comprises the lid 18a and a body 18b, both of which are shown only in part in FIG. 3. A front wall of the lid 18a facing the pocket 20 is pivotably engaged with a front wall of the body 18b also facing the pocket 20, by means of a hinge 47, so that the lid 18a can be pivotally lifted about the hinge 47 together with the armrest 22 and the speaker box 24 to expose the interior of the trunk 18 to the outside.

The armrest 22 comprises a filler 30 formed of a resilient material, preferably polyurethane foam, and an outer shell 31 enclosing the filler 30. The outer shell 31 is formed of synthetic resin and has its underside formed with engaging protuberances 31a, 31b and 31c, respectively, at a front end, an intermediate portion and a rear end thereof. The engaging protuberances 31a and 31b engage, respectively, a front end edge and a rear end edge of the ceiling wall of the pocket 20 to locate the armrest 22 with respect to the ceiling wall. The engaging protuberance 31c abuts against the upper surface of the lid 18a of the trunk 18. The pocket 20 has its rear wall and its ceiling wall fastened, respectively, to the lid 18a of the trunk 18 and the bottom of the outer shell 31 of the armrest 22, by means of bolts 48 and 49. In this way, the armrest 22 is secured to the pocket 20 and the trunk 18.

The speaker box 24 formed integrally with the armrest 22 comprises a rear wall 24a which is rearwardly upwardly directed, and a front wall 24b which is forwardly upwardly directed. The rear and front walls 24a, 24b cooperate with the lid 18a to form a speaker box of a generally triangular section. The speaker box 24 is formed of the same synthetic resin as the outer shell 31 of the armrest 22, and the front wall 24b has an outer or upper surface continuous with an upper surface of the outer shell 31.

The front wall 24b has a generally rectangular opening 24c formed therethrough and facing forwardly upwardly at a predetermined angle with respect to the horizontal, determined by the angle of inclination of the front wall 4b. A speaker grille 32 is fitted in the opening 24c.

The speaker 33 is mounted within the speaker box 24, with its cone 34 secured to an inner peripheral edge of the opening 24c by means of bolts 35 and 36.

The speaker box 24 constructed as above has its walls 24a, 24b mounted on frames 40 and 41 which are formed of synthetic resin or the like and in turn secured to the lid 18a of the trunk 18 by means of bolts 38 and 39, in a manner that the walls 24a, 24b are held by the frames 40, 41 by the elasticity of the frame 40 and can be manually removed from the frames 40, 41 by pulling the walls away from the frames 40, 41. More specifically, the frame 40 is formed of an elastic synthetic resin plate member and disposed to elastically stretch itself rearwardly of the motorcycle body or in the leftward direction as viewed in FIG. 3 to hold itself urged against an inner surface of the rear wall 24a of the speaker box 24 so that the frame 41 arranged opposite the frame 40 is urged against a rib 24d formed integrally on an inner surface of the front wall 24b of the speaker box 24. Thus, the armrest 22 is removably mounted on the trunk 18 together with the speaker box 24 and the pocket 20.

The armrest 21, the pocket 19, the speaker box 23 and the speaker 33' on the left side of the motorcycle body 1, all appearing in FIG. 1, are also arranged and constructed in the same manners as the armrest 22, the pocket 20, the speaker box 24, and the speaker 33.

Figure 4:
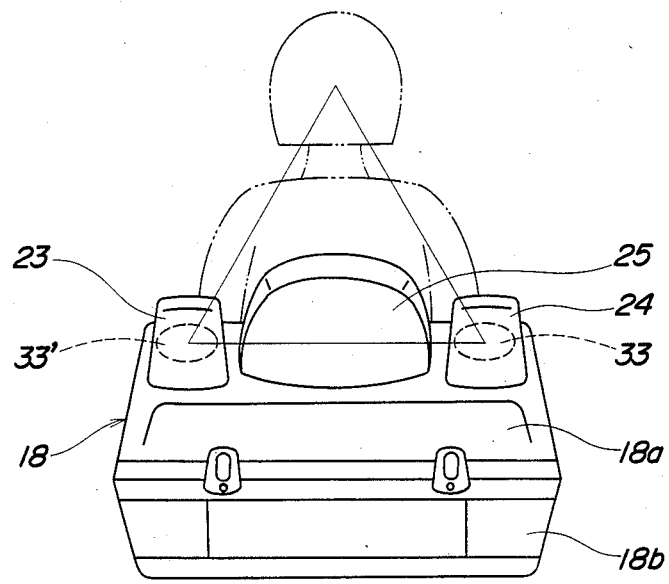
FIG. 4 is a rear view of the motorcycle, showing a pair of rear speakers and a rider on the rear seat in a triangular array.

The openings 24c and 23a (FIG. 1) of the speaker boxes 24, 23, and the front surfaces of the speakers 33, 33' on the right and left sides are all directed forwardly upwardly at a predetermined angle with respect to the horizontal, as noted before. Further, as shown in FIG. 4, the centers of the right rear speaker 33 and the left rear speaker 33' and the center of the head of the rider on the rear seat 10 are arranged in a triangular array with the three centers as the apexes of the triangle. This arrangement of the speaker boxes 23, 24 enhances the stereo effect. A regular triangular array of the speakers 33, 33' with respect to the rear seat rider's head would further enhance the stereo effect.

A gap 46 for guiding a harness or electric conductor is defined between the front wall of the trunk 18 and the rear wall of the pocket 20, by an arm 47a of the hinge 47 in contact with the rear wall of the pocket 20, in a manner enclosed by the pocket 20 and the trunk 18. Another gap 45 for the same purpose is defined between the underside of the armrest 22 and the lid 18a of the trunk 18, by the aforementioned engaging protuberance 31c abutting against the upper surface of the lid 18a, in a manner enclosed by the armrest 22 and the lid 18a of the trunk 18. The speaker 33 is electrically connected to the harness 44 by means of a coupler 43, which is in turn led out of the speaker box 24 and passed through the gaps 45, 46 and connected to the sound system. In this way, the harness 44 is not exposed to the outside of the motorcycle body 1, thus being protected from rainwater, etc. The speaker 33' mounted within the speaker box 23 on the left side is also electrically connected to the sound system in the same manner as the rear left speaker 33.

An operation unit 25 of the sound system is mounted on a slightly rearwardly inclined upper surface of the shelter 11 in a manner facing the driver, as shown in FIGS. 1 and 2. The operation unit 25 has operating knobs 26 and 27, and a balance controller 28 mounted on its panel. The knobs 26, 27 are operated to vary the absolute volume of the speakers, select channels, etc.

Figure 5:
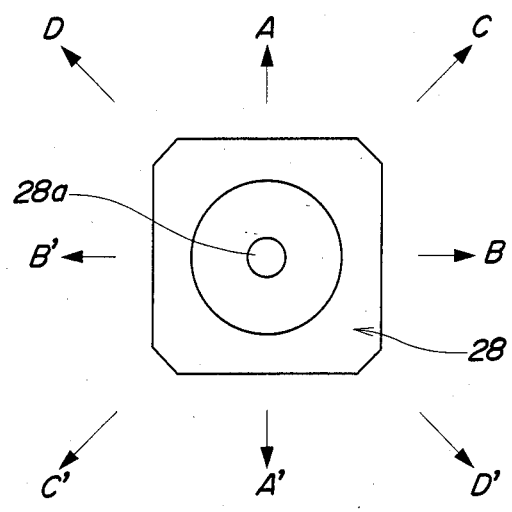
FIG. 5 is a top plan view of a balance controller employed in the speaker system.

The balance controller 28 is operated to adjust the volume of a speaker or speakers relative to the other speakers, and has an operating lever 28a as shown in FIG. 5, which can be pushed down in all directions to increase the volume of a speaker in a direction in which it is pushed down. For instance, if the operating lever 28a is pushed down in the forward direction (the direction A in FIG. 5), the volumes of the left front speaker 13 and right front speaker 14 are increased, while if the lever 28a is pushed down in the rearward direction (the direction A'), the volumes of the right rear speaker 33 and left rear speaker 33' are increased. If the lever 28a is pushed down in the rightward or B direction or in the leftward or B' direction in FIG. 5, the volumes of the right front speaker 14 and right rear speaker 33, or the volumes of the left front speaker 13 and left rear speaker 33' are increased, respectively. If the lever 28a is pushed down in the rightward forward or C direction or in the leftward rearward or C' direction, the volume of the right front speaker 14 or the left rear speaker 33' is increased, respectively, whereas if the lever is pushed down in the left forward or D direction, or in the right rearward or D' direction, the volume of the speaker left front speaker 13 or the right rear speaker 33 is increased, respectively. In this way, the driver can obtain the best sound effect by operating the lever 28a according to the ambient conditions or to his preference.

With the above arrangement of the speaker system, the front speakers 13, 14 at the front side of the motorcycle body 1 and the rear speakers 33, 33' on the rear side thereof form sound sources so that the driver on the front seat 9 closer to the front speakers and the rider on the rear seat 10 closer to the rear speakers can both enjoy listening to speaker sound in identical acoustic conditions, during running of the motorcycle. Further, better sound effects can be obtained by operating the operating lever 28a of the balance controller 28 in a desired direction so as to adjust the relative volumes of the speakers 13, 14, 33, and 33'. Besides, the rider on the rear seat 10 can enjoy a stereo effect due to the triangular array of the rear speakers 33, 33' and his head.

Moreover, the rear seat rider can relax himself with his arms leaned on the armrests 21, 22, enjoying sound from the speakers in a comfortable position.

Even when the driver alone is riding on the motorcycle, he can enjoy a high-presence sound from the four speakers 13, 14, 33, and 33' on the front and rear sides.

Figure 6:
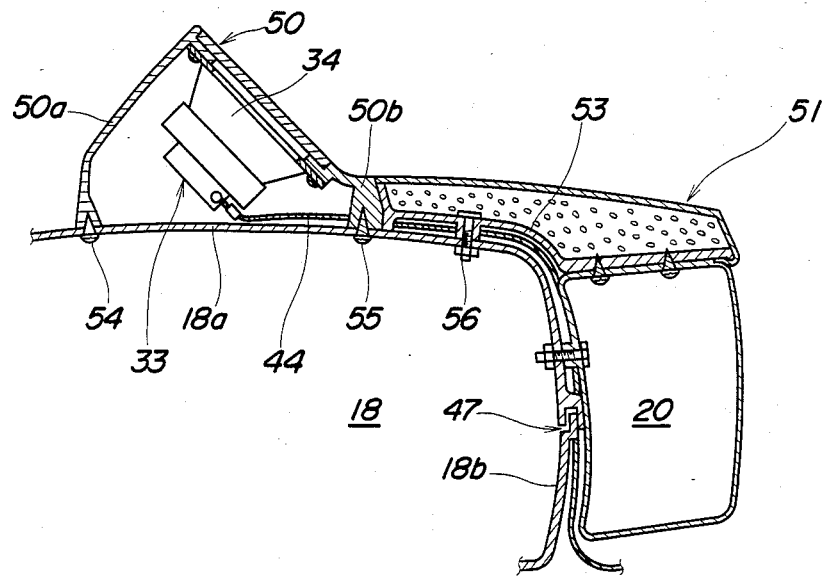
FIG. 6 is a sectional view similar to FIG. 3, showing a second embodiment of the speaker system according to the invention.

FIG. 6 illustrates a second embodiment of the invention. As distinct from the first embodiment of FIG. 3, a speaker box 50 in the second embodiment is fabricated discretely or in a separate body from an armrest 51. The speaker box 50 has a rear wall 50a and a front wall 50b fastened directly to the lid 18a of the trunk 18 by means of bolts 54 and 55, while the armrest 51 has its bottom wall 53 fastened to the lid 18a of the trunk 18 by means of bolts 56 so that the front wall 50b of the speaker box 50 urgingly abuts against the rear end of the armrest 51. The other parts and elements not referred to above are arranged and constructed in the same manners as corresponding ones in FIG. 3, description of which is therefore omitted.

What is claimed is:

1. A motorcycle comprising: a frame body having opposite lateral sides; a pair of front and rear seats mounted on said frame body; a receptacle mounted on said frame body at a location rearward of said rear seat; and a pair of speakers arranged on said receptacle at said opposite lateral sides of said frame body, said speakers each having a front surface thereof directed forwardly upwardly of said frame body.

2. A motorcycle as claimed in claim 1, wherein said receptacle has a lid, said speakers each including a speaker box mounted on said lid.

3. A motorcycle as claimed in claim 2, including a pair of armrests arranged forwardly of said receptacle and at said opposite lateral sides of said frame body.

4. A motorcycle as claimed in claim 3, wherein said speaker boxes each have an upwardly facing surface, said armrests each having an upwardly facing surface continuous with said upwardly facing surface of an associated one of said speaker boxes.

5. A motorcycle as claimed in claim 4, wherein said each speaker box is formed integrally in one body with said associated one of said armrests.

6. A motorcycle as claimed in claim 6, including means mounting said each speaker box and said associated one of said armrests on said lid of said receptacle, in a manner permitting removal of the former from the latter.

7. A motorcycle as claimed in claim 4, wherein said each speaker box is formed in a separate body from said associated one of said armrests.

8. A motorcycle as claimed in claim 7, including means rigidly securing said each speaker box and said associated one of said armrests to said lid of said receptacle.

9. A motorcycle as claimed in claim 3, including means defining spacing between said receptacle and each of said armrests in a manner enclosed by said receptacle and said each of said armrests.

10. A motorcycle as claimed in claim 3, including a second receptacle arranged below at least one of said armrests.

11. A motorcycle as claimed in claim 1, including a fairing mounted on said frame body at a front side thereof and having opposite lateral side portions, and a pair of second speakers arranged inside said opposite lateral side portions of said fairing.

12. A motorcycle as claimed in claim 11, including a shelter mounted on said frame body and located forwardly of said front seat, balance controller means for adjusting the relative volumes of said first-mentioned speakers and said second speakers.

13. A motorcycle as claimed in claim 12, including volume adjusting means mounted on said shelter for adjusting the absolute volume of said first-mentioned speakers and said second speakers.

* * * * *